United States Patent [19]

Seo

[11] Patent Number: 4,843,365

[45] Date of Patent: Jun. 27, 1989

[54] MAGNETORESISTANCE ELEMENT

[75] Inventor: Yuzo Seo, Kamakura, Japan

[73] Assignee: Mitsubishi Kasei Corporation, Tokyo, Japan

[21] Appl. No.: 160,190

[22] Filed: Feb. 25, 1988

[30] Foreign Application Priority Data

Mar. 2, 1987 [JP] Japan .................................. 62-045172

[51] Int. Cl.$^4$ .......................................... H01L 43/00
[52] U.S. Cl. .................................... 338/32 R; 324/252
[58] Field of Search ...................... 338/32 R; 324/252; 360/113

[56] References Cited

U.S. PATENT DOCUMENTS

| | | | |
|---|---|---|---|
| 4,418,372 | 11/1983 | Hayashida et al. ................. | 360/113 |
| 4,500,867 | 2/1985 | Ishitobiy et al. ............... | 338/32 RX |
| 4,533,872 | 8/1985 | Boord et al. .................... | 338/32 RX |
| 4,584,552 | 4/1986 | Suzuki et al. .................. | 338/32 RX |
| 4,727,323 | 2/1988 | Zabler ............................... | 324/252 |

*Primary Examiner*—C. L. Albritton
*Attorney, Agent, or Firm*—Stephen F. K. Yee

[57] ABSTRACT

A magnetoresistance element comprises one or more magnetoresistors whose resistances are varied with the change in magnitude of the magnetic field produced by a multipolar magnet disposed on a moving object. The magnetoresistors are provided adjacent to the object and arranged to have a sensitivity which is distributed along the moving direction of the object with a predetermined distribution breadth and which has one or more peak values, so as to provide an output a signal having a sinusoidal waveform.

10 Claims, 5 Drawing Sheets

MAGNETORESISTANCE ELEMENT

BACKGROUND OF THE INVENTION

1. Field of the Invention

This invention relates to a magnetoresistance element suitably used for a magnetic encoder, and more particularly, to a magnetoresistance element which can stably output a signal which is varied in a sinusoidal manner with the rotation of a rotor magnet, necessary for analyzing an output signal of a magnetic encoder in high resolution using an analog method, irrespective of its attached position or the pattern of the magnetic poles provided in the rotor magnet.

2. Description of the Prior Art

Recently, there has been widely employed a magnetic encoder instead of an optical encoder employed conventionally. Such a magnetic encoder mainly comprises a rotor 1 having a multipolar magnet formed on the outer circumference thereof, and a magnetoresistance element 2 disposed at the stator side, as shown in FIG. 1. In the figure, reference numeral 3 represents a shaft fixedly connected to the rotor 1; 4, a bearing for the shaft 3; 5, a case of the magnetic encoder; and 6, a base plate on which is provided a signal processing circuit for processing the output signal of the magnetoresistance element 2, and so on.

Usually, the magnetoresistance element 2 includes four magnetoresistors $a_1$, $a_2$, $b_1$ and $b_2$ on a same substrate so that respective phase differences between the magnetoresistors $a_1$ and $a_2$, and between the magnetoresistors $b_1$ and $b_2$ become 180 degrees ($\pi$ radians) in electrical angle as shown in FIG. 2, or the phase difference beween the magnetoresistors $a_1$ and $b_1$ becomes 90 degrees ($\pi/2$ radians). The respective one ends of the magnetoresistors $a_1$ and $a_2$ are connected to a common electrode $C_a$, the respective one ends of the mangetoresistors $b_1$ and $b_2$ are connected to a common electrode $C_b$, and the respective another ends of the magnetoresistors $a_1$, $a_2$, $b_1$ and $b_2$ are connected to respective electrodes $L_{a1}$, $L_{a2}$, $L_{b1}$ and $L_{b2}$, respectively. In FIG. 2, an imaginary line represents an object to be detected such as the rotor 1. The rotor 1 has many magnetic poles so formed on the outer circumference thereof that N-pole and S-pole are arranged alternately, and moves in the direction indicated by an arrow P.

FIG. 3 shows a circuit for obtaining two output signals A and B whose phases are different from each other, by using the magnetoresistance element 2 having the configuration shown in FIG. 2. In the figure, $OP_1$ and $OP_2$ represent comparators; $R_1$ to $R_4$, resistors; and $T_A$ and $T_B$, output terminals of the output signals A and B, respectively.

Conventionally, the resolving power of the magnetic encoder has been improved by reducing the pitch of the magnetized pattern in the multipolar magnet of the rotor 1 as well as the respective distances between the magnetoresistors $a_1$ and $a_2$, and between the magnetoresistors $b_1$ and $b_2$ of the magnetoresistance element 2. However, if the pitch of the mangetized pattern is reduced, the range of the magnetic field produced by the magnetic poles decreases. For this reason, the magnetoresistance element 2 must be disposed close to the rotor 1. In this case, high accuracy is required in the components used for the encoder and in assembling of the encoder. Therefore, the encoder is more expensive to manufacture and the risk of damaging the encoder increases due to contact between the rotor 1 and the magnetoresistance element 2 from to vibration or force exerted to the rotational axis of the encoder.

In a positional sensor referred to as a synchronous resolver, a method has long been employed for improving the resolving power using natures of trigonometric functions.

FIG. 4 shows an example of a circuit for the magnetic encoder to which the above method is applied. In the figure, reference numeral 11 reprents an oscillator; 12, a counter; 13, a sin-ROM (Read Only Memory) in which sine values have been stored corresponding to the count values of the counter 12; 14, a cos-ROM in which cosine values have been stored corresponding to the count values of the counter 12; 15 and 16, digital-to-analog (D/A) converters; 17 to 20, amplifiers; 21 to 24, variable resistors; $a_1$, $a_2$, $b_1$ and $b_2$, magnetoresistors; 25 and 26, resistors; 27, a comparator for detecting a zero-cross point; and 28, a D-flip flop.

In operation, the oscillator 11 generates pulses in turn at a predetermined timing and the counter 12 counts the number (for example 0 to 255) of the pulses supplied from the oscillator 11. The count value of the counter 12 is supplied to the sin-ROM 13, the cos-ROM 14 and the D-flip flop 28, respectively. When the count value of the counter 12 is supplied to the addresses of the sin-ROM 13 and the cos-ROM 14, corresponding sine and cosine digital values are read out from the data of the sin-ROM 13 and the cos-ROM 14, respectively, and are supplied to the digital-to-analog converters 15 and 16, respectively. The digital-to-analog converters 15 and 16 convert the input digital values to analog values. The output of the digital-to-analog converter 15 is supplied to the amplifiers 17 and 18, respectively, and the output of the digital-to-analog converter 16 is supplied to the amplifiers 19 and 20, respectively.

The amplifiers 17 and 19 amplify the input analog values and then supply the amplified signals to the electrodes $L_{a1}$ and $L_{b1}$ via the variable resistors 21 and 23, respectively. Accordingly, AC voltage signals in proportion to $\sin\omega t$ and $\cos\omega t$ (where $\omega$ is angular frequency) are applied to the electrodes $L_{a1}$ and $L_{b1}$, respectively. On the other hand, the amplifiers 18 and 20 invert the phases of the input analog values and amplify the phase-inverted analog values, and then supply them to electrodes $L_{a2}$ and $L_{b2}$ via the variable resistors 22 and 24, respectively. Accordingly, AC voltage signals in proportion to $(-\sin\omega t)$ and $(-\cos\omega t)$ are applied to the electrodes $L_{a2}$ and $L_{b2}$, respectively. The voltage at the point $C_a$ which corresponds to the common electrode of the magnetoresistors $a_1$ and $a_2$ is added to the voltage at the point $C_b$ which corresponds to the common electrode of the magnetoresistors $b_1$ and $b_2$, and the thus added signal is supplied to the positive input terminal of the comparator 27 via the resistor 25. The negative input terminal of the comparator 27 is connected to the earth. The comparator 27 detects a zero-cross point on the basis of the above signal obtained by adding the voltages at the point $C_a$ and $C_b$, and the D-flip flop acts to take in signals on the basis of the detected result of the comparator 27.

Assuming that if DC voltage signal is applied to the magnetroresistors $a_1$ and $a_2$, and $b_1$ and $b_2$, the voltage at the point $C_a$ is proportional to $\cos\theta$ and the voltage at the point $C_b$ is proportional to $\sin\theta$, where $\theta$ is a rotational angle of the rotor 1 represented in electrical angle in radians provided one pitch of the magnetic poles of the rotor 1 is $2\pi$. Under the condition, if AC voltage signal is applied to the magnetoresistors $a_1$ and $a_2$, and $b_1$ and $b_2$, new AC voltage signal whose phase is shifted by $\theta$ relative to that of the initally applied AC voltage singal can be obtained by adding respective voltages at the points $C_a$ and $C_b$, which is expressed as follows:

$$V = K(\sin\omega t \cdot \cos\theta + \cos\omega t \cdot \sin\theta) \qquad (1)$$
$$= K \cdot \sin(\omega t + \theta)$$

where K is a constant.

Accordingly, even small rotational angle corresponding to less than one pitch of the magnetic poles can be detected by detecting the phase difference between the applied signal and the added signal.

The above equation (1) can be applied accurately to the case only where the resistance of the magnetoresistance element 2 varies sinusoidally with the rotational angle of the rotor 1. However, as a result of observing the voltages at the points $C_a$ and $C_b$ when applying DC voltage across the magnetoresistance element 2, it has been found that the form of the obtained output voltage curve is considerably distorted from a sinusoidal waveform when the magnetoresistance element 2 is set close to the rotor 1 on the one hand, and the form of same is similar to the sinusoidal waveform but the output voltage decreases and is liable to be affected by noise when the magnetoresistance element 2 is set apart from the rotor 1.

SUMMARY OF THE INVENTION

Accordingly, it is an object of this invention to provide a magnetoresistance element whose resistance varies sinusoidally with the displacement of the magnetic poles of the object (rotor) to be detected, regardless of the set distance beween the magnetic poles of the object to be detected and the magnetoresistance element.

It is a further object of this invention to provide a magnetoresistance element whose resistance varies sinusoidally with the displacement of the magnetic poles of the object to be detected even when the pattern of the magnetic field produced by the magnetic poles of the object to be detected is distorted from the sinusoidal one.

It is still a further object of this invention to provide a mangnetoresistance element which makes possible to realize a positional sensor such as a magnetic encoder using an analog analyzing method, whose resolving power is improved.

It is still a further object of this invention to provide a magnetoresistance element which enables to realize a positional sensor, such as a magnetic encoder, which detects a signal stably and accurately with high resolution power and with low cost.

In accomplishing the foregoing objects, there is provided in accordance with the present invention a magnetoresistance element for detecting a displacement of a moving object by detecting the change in magnitude of the magnetic field produced by a plurality of opposite magnetic poles alternately arranged on said object to be detected, comprising one or more magnetoresistors provided adjacent to said magnetic poles for detecting the change in magnitude of the magnetic field and arranged to have a sensitivity which is distributed along the displacing direction, with a distribution breadth substantially equal to a multiple of one pitch of said magnetic poles and which has one or more peak values.

With such construction, since the sensitive portion of the magnetoresistance element has the distribution breadth relative to the displacing direction of the magnetic poles of the oject to be detected, the change in the output voltage of the magnetoresistance element relative to the displacement of the object to be detected becomes substantially sinusoidal in form, regardless of the set distance between the magnetic poles of the object to be detected and the mangetoresistance element, and the distribution of the magnetic field produced by the magnetic poles of the object to be detected.

For example, the sensitivity distribution W of the magnetoresistance element is set to satisfy the follwing equation:

$$W = \alpha + \beta \cdot \cos \delta$$

where $\alpha$ is a real number, $\beta$ is a real number but not equal to zero, $\delta$ is a positional coordinate in the displacing direction of the magnetic poles and is represented in radians provided the amount of the displacement through one cycle of the change in magnitude of the magnetic field is $2\pi$.

Each magnetoresistor in this invention may be in the form of a curved line which has two inflection points and is symmetrical with respect to its center point. This configuration is simplest and has an advantage that manufacturing of the element is very easy.

Also, the magnetoresistor in this invention may be formed substantially in the shape of a parabola whose center axis is in the direction perpendicular to the displacing direction of the magnetic poles. In this case, the electrodes can be disposed only at one side. Such configuration has another advantage, in addition to the above, that the magnetoresistance element can be made small because it can be arranged on a small area.

Each of the magnetoresistors may be composed of a plurality of portions connected in series and each substantially in the form of a parabola whose center axis is perpendicular to the displacement direction of the magnetic poles.

In a further embodiment, each of the magnetoresistors has a meandering pattern having portions which extend in the direction perpendicular to the direction of the displacement of the magnetic poles and whose lengths are gradually changed along the direction of the displacement of the magnetic poles. This structure is more excellent in sensitivity than the other configurations mentioned above.

The magnetoresistance element of this invention may be formed by any known method such as by etching a semiconductor or ferromagnetic thin film to leave a desired pattern.

Additional objects and features of this invention will be apparent from the following description of the preferred embodiments.

DETAILED DESCRIPTION OF THE PREFERRED EMBODIMENTS

Figure 1:
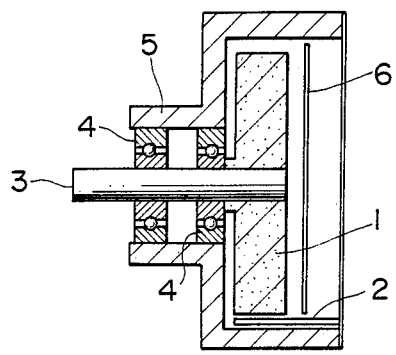
FIG. 1 is a schematic view in cross section of a magnetic encoder in general.

Before explaining the preferred embodiments, it will be explained a principle of this invention.

A change $\rho$ in resistance of a magnetoresistance element at a positon $\delta$ on the coordinate on a substrate along the rotational direction of a rotor (object to be detected) is a function of the sum of the position $\delta$ and the rotational angle $\theta$ of the rotor, and is represented by a periodic function whose period is $2\pi$. This function can be expanded in a Fourier series as follows:

$$\rho(\delta + \theta) = \sum_{k=1}^{k} \{P_k \cdot \cos k(\delta + \theta) + q_k \cdot \sin k(\delta + \theta)\} \quad (2)$$

Now, it is assumed that the magnetoresistance element has a configuration so that its sensitivity distribution through the range of 0 to $2\pi$ of $\delta$ is:

$$W = \alpha(1 + \cos\delta) \quad (3)$$

where $\alpha$ is a real number. The change in resistance of the entire magnetoresistance element is given by integrating the product between the equations (2) and (3) as follows:

$$\int_0^{2\pi} \rho(\delta + \theta) \cdot W d\delta = \alpha \cdot \sum_{k=1}^{k} \int_0^{2\pi} \{P_k \cdot \cos k(\delta + \theta) + q_k \cdot \sin k(\delta + \theta)\}\{1 + \cos\delta\}d\delta \quad (4)$$

In this integration, the terms other than $k=1$ term become zero due to the nature of the trigonometric functions. Consequently, the equation (4) can be rewritten as follows:

$$\int_0^{2\pi} \rho(\delta + \theta) \cdot W d\delta = \gamma \cdot \sin(\delta + \epsilon) \quad (5)$$

where $\gamma$ and $\epsilon$ are constants determined by $p_1$ and $q_1$, respectively. Accordingly, an output in sinusoidal form always can be obtained with the above configuration of the sensitive portion even when the change in resistance at the position $\delta$ of the magnetoresistance element is distorted in any manner. Moreover, the equation (3) can be expressed as the following general equation:

$$W = \alpha + \beta \cdot \cos\delta \quad (6)$$

where $\alpha$ is an arbitrary real number and $\beta$ is a real number but not equal to zero.

Next, it will be explained the preferred embodiments of the magnetoresistance elements according to this invention.

Figure 5:
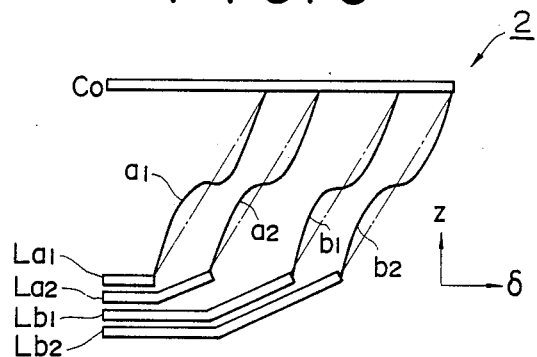
FIG. 5 is a plan view of a preferred embodiment of this invention.

FIG. 5 is a plan view of the magnetoresistance element 2 of the first embodiment according to this invention, in which $C_o$ represents a common electrode; $L_{a1}$, $L_{a2}$, $L_{b1}$ and $L_{b2}$, electrodes; $a_1$, $a_2$, $b_1$ and $b_2$, magnetoresistors each having a distribution in the sensitivity along the rotational direction of the rotor 1. The pattern shown in FIG. 5 is most fundamental one.

Figure 2:
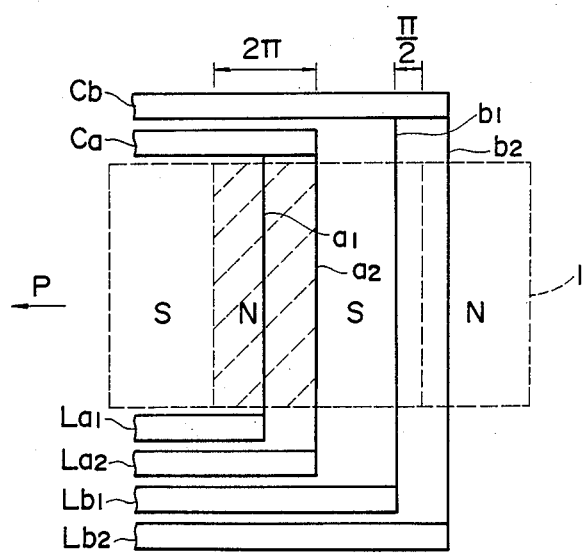
FIG. 2 is a plan view of the magnetoresistance element used conventionally.
Figure 3:
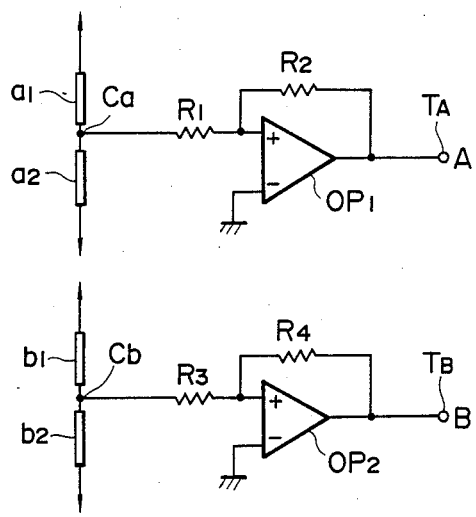
FIG. 3 is a block diagram of a circuit used for the conventional magnetic encoder.

The magnetoresistance element 2 may be formed by providing a ferromagnetic or semiconductor thin flim on an insulating substrate made of glass, etc., and leaving a predetermined pattern by using a method such as etching, as shown in FIG. 2. As the pattern, it is typical to provide two to eight magnetoresistors in such a manner that whose their phases are shifted in turn, as shown in FIG. 2. The dimension of the magnetoresistance element is for example several hundreds in thickness and approximately 10 $\mu$m in line width, and the dimension of the magnetic pole is for example one hundred to several hundreds $\mu$m in width.

The conventional magnetoresistors are arranged parallel to the magnetic boundary line between N-pole and S-pole of the multipolar magnet of the rotor 1, namely, arragned on the portion corresponding to single electrical angle, as shown in FIG. 2. On the contrary, the magnetoresistors of this invention are arranged to have a tilt relative to the magnetic boundary line as shown in FIG. 5, namely, arranged to have a distribution of electrical angles. Since the magnetoresistance element of this invention has the distribution in the sensitivity, higher order components of the output signal can be restrained and only fundamental wave component can be taken out effectively.

Next, it will be explained the relation between the distribution of the magnetically sensitive portion and the form of the respective magnetoresistors $a_1$, $a_2$, $b_1$ and $b_2$ of the magnetoresistance element 2.

Now, the $\delta$-axis is in the plane of the magnetoresistance element 2, along the rotational direction of the rotor 1 and the z-axis is along the direction perpendicular to the $\delta$-axis. Within the non-saturation range of the resistance, the change in resistance of the magnetoresistance element 2 is proportional to the magnitude of the magnetic field component in the direction perpendicular to the current flowing direction and the magnetic field component in the direction parallel to the plane is only that in the direction. Accordingly, provided an angle between an infinitesimal path dl of the magnetoresistor $a_1$, $a_2$, $b_1$ and $b_2$ and the z-axis is $\psi$, the change in resistance at the infinitesimal path dl is proportional to dl·cos$\psi$. If the z-axis component and the $\delta$-axis component of the infinitesimal path dl are dz and d$\delta$, respectively, the change in resistance at dl is proportional to dz. Consequently, it may be considered that the magnitude of the sensitive portion at the position $\delta$ is proportional to dz/d$\delta$.

Now, the form of the magnetoresistor is represented by a function f($\delta$). According to the condition of the magnitude of the sensitive portion at the position $\delta$, the function f($\delta$) must satisfy the following equation:

$$df(\delta)/d\delta = \gamma \cdot (\alpha + \beta \cdot \cos\delta) \quad (7)$$

where $\gamma$ is a proportional constant. The equation (7) can be solved easily by integration as follows:

$$f(\delta) = \gamma \cdot (\alpha \cdot \delta + \beta \sin\delta) + C \quad (8)$$

where C is an arbitrary constant. In the actual magnetoresistance element, the scale in the z-axis and the position of the origin can be given arbitrarily. Considering these degree of freedom, the equation (8) can be simplified as follows:

$$f(\delta) = \alpha \cdot \delta + \beta \cdot \sin\delta \quad (9)$$

As the factor to be noted here is not "the position in the z-direction" but "magnitude" of the sensitive portion at $\delta$, the form of the magnetoresistor may be folded back at its arbitrary position. Besides, when two sinusoidal waves whose phases are slightly different to each other, are superimposed a new sinusoidal wave having intermediate phase can be obtained. By utilizing these natures, magnetoreistor lines each having different phase to each other may be arranged on a small area, or they may have the configuration such that lead wires can be easily led out. The examples of patterns of the thus constructed magnetoresistors are shown in FIG. 6 and FIG. 7 as further embodiments of this invention.

Figure 6:
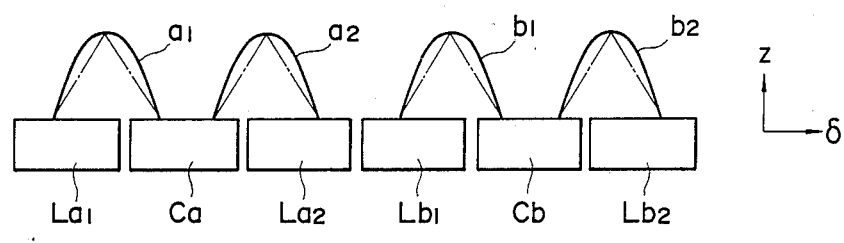
FIG. 6 to FIG. 8 are plan views of other preferred embodiments of this invention, respectively.

FIG. 6 is an example in which the magnetoresistor is in the form of a folded pattern and the electrodes are disposed at only one side. Namely, this configuration of substantially parabola form is obtained by folding back the parttern shown in FIG. 5 at its center. With such configuration, the magnetoresistor lines can be arranged on a small area and the electrodes can be disposed only at one side, so that the magnetoresistance element can be made small.

Figure 7:
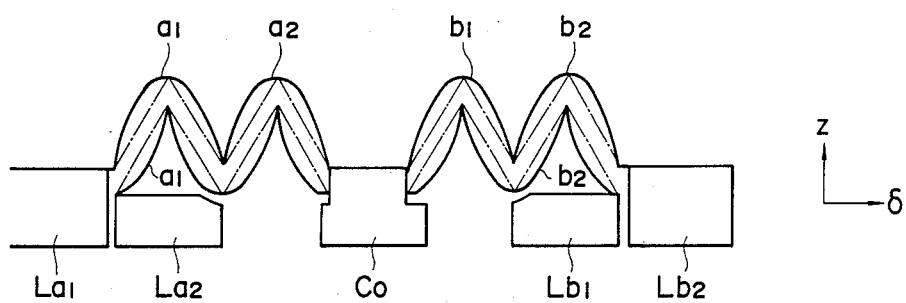

FIG. 7 is an example in which the magnetoresistor is in the form of a folded pattern which comprises two portions substantially in the form of a parabola connected in series, and the electrodes are disposed at only one side. With such configuration, there is another advantage, in addition to the above, that electromotive forces produced by the change in the magnetic field are canceled, to improve the accuracy of the detection.

Figure 8:
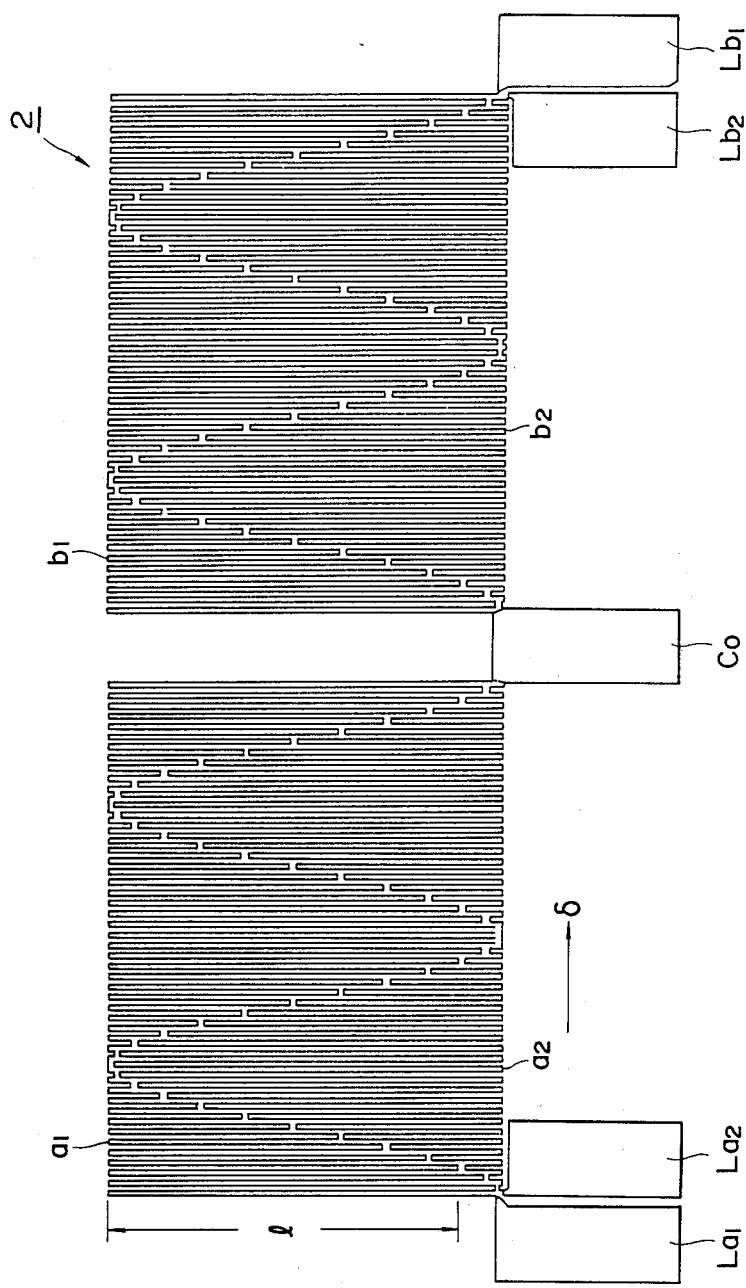

Moreover, according to this invention, each magnetoresistor may have a meandering pattern having portions which extend in the direction (z-direction) perpendicular to the direction of the displacement of the magnetic poles and whose lengths are gradually changed along the direction of the displacement of the magnetic poles. Magnetoresistors having such a construction is shown in FIG. 8, in which the length of portions of the magnetoresistor extending in the z-direction satisfy the relation:

$$l = \alpha + \beta \cdot \cos\delta$$

This arrangement is excellent in sensitivity where the pitch of the magnetized pattern of the mulitpolar magnet of the rotor 1 is larger than the width of the magnetoresistor, because a larger number of magnetoresistor lines can be arranged on the same area, compared with the above mentioned configurations.

Figure 4:
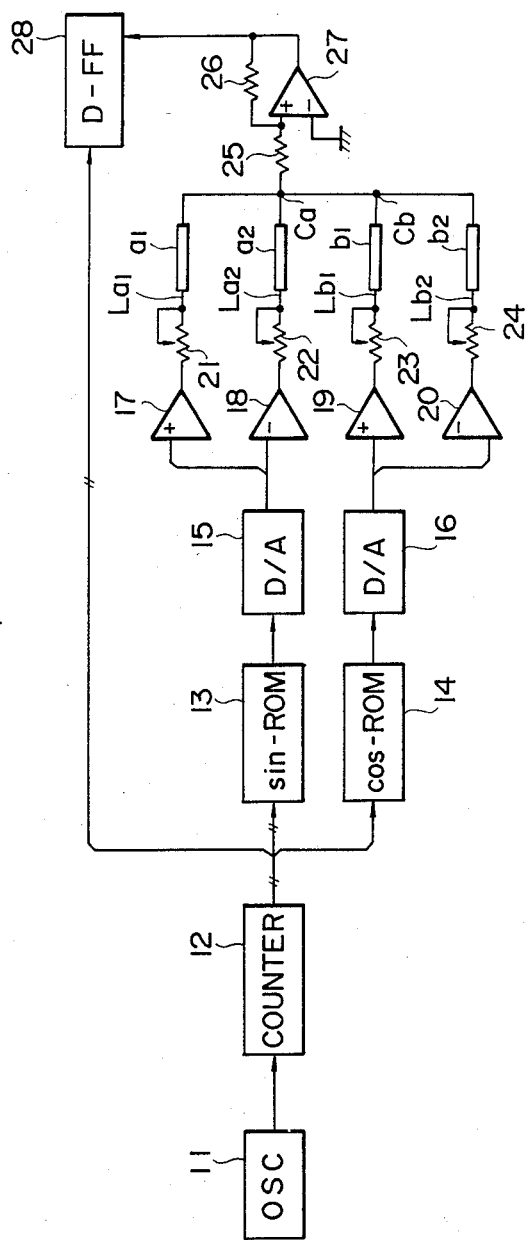
FIG. 4 is a circuit diagram of a magnetic encoder using the circuit in FIG. 3.

The magnetoresistance element 2 according to this invention can always output a signal in sinusoidal form without changing the waveform, irrespective of the magnetic pattern of the multipolar magnet in the rotor 1 (see FIG. 1 and FIG. 2) or the distance between the magnetoresistance element 2 and the rotor 1. Consequently, it is suitable for use in a magnetic encoder which must obtain a signal with high resolution power, as shown in FIG. 4.

Having described this invention in connection with embodiments thereof heretofore, it is to be understood that the present invention is not limited to the above embodiments and many modifications can be made within the technical concept of this invention.

For example, although the above embodiments have been explained with four magnetoresistors, any number such as two, six, eight, etc. of magnetoresistors may be employed in this invention.

Additionally, although the above embodiments have been explained with the magnetoresistors having the configurations as shown in FIG. 5 to FIG. 8, magnetoresistors having any other configuration may be employed in this invention if it satisfies the requirement that the magnetically sensitive portion of the magnetoresistance element has a distribution breadth substantially equal to multiple of one pitch of the magnetic poles and has at least one peak value.

What is claimed is:

1. A magnetoresistance element for detecting displacement of a moving object by detecting the change in magnitude of the magnetic field produced by a plurality of opposite magnetic poles alternately arranged on said object to be detected, comprising at least one magnetoresistor provided adjacent to said magnetic poles for detecting the change in magnitude of the magnetic field, each of said magnetoresistor exhibiting a sensitivity which is distributed along the displacing direction of said object and which has at least one peak value, said sensitivity distribution being determined by the shape of said magnetoresistor which varies in the displacing direction, the length of said magnetoresistor parallel with the displacing direction being a multiple of one pitch of said magnetic poles.

2. The magnetoresistance element according to claim 1, wherein the sensitivity distribution satisfies the following equation:

$$W = \alpha + \beta \cdot \cos\delta$$

where $\alpha$ is a real number, $\beta$ is a real number other than zero, and $\delta$ is a positional coordinate in the displacing direction of said magnetic poles and is represented in radians provided the amount of the displacement through one cycle of the change in magnitude of the magnetic field is $2\pi$.

3. The magnetoresistance element according to claim 1, wherein each magnetoresistor is in the form of a curved line which has two inflection points and is symmetrical with respect to its center point.

4. The magnetoresistance element according to claim 1, wherein each magnetoresistor is substantially in the form of a parabola whose center axis is perpendicular to the displacing direction of said magnetic poles.

5. The magnetoresistance element according to claim 1, wherein each magnetoresistor comprises a plurality of portions connected in series and each substantially in the form of a parabola whose center axis is perpendicular to the displacement direction of said magnetic poles.

6. The magnetoresistance element according to claim 1, wherein each magnetoresistor has a meandering pattern having portions which extend in the direction perpendicular to the direction of the displacement of said magnetic poles and whose lengths are gradually changed along the direction of the displacement of said magnetic poles.

7. The magnetoresistance element according to claim 1, wherein each magnetoresistor is made of a semiconductor thin film.

8. The magnetoresistance element according to claim 7, wherein each magnetoresistor is formed by etching the semiconductor thin film to leave a predetermined pattern.

9. The magnetoresistance element according to claim 1, wherein each magnetoresistor is made of a ferromagnetic thin film.

10. The magnetoresistance element according to claim 9, wherein each magnetoresistor is prepared by etching the ferromagnetic thin film to leave a predetermined pattern.

* * * * *